(12) United States Patent
Huang et al.

(10) Patent No.: US 11,825,434 B2
(45) Date of Patent: Nov. 21, 2023

(54) METHOD AND ARCHITECTURE OF SYNCHRONIZATION OF WIRELESS COMMUNICATION SYSTEM

(71) Applicant: National Yang Ming Chiao Tung University, Hsinchu (TW)

(72) Inventors: Chia-Chi Huang, Hsinchu (TW); Pai-Hsiang Shen, Taipei (TW); Ping-Ju Lin, Zhunan Township (TW); Kang-Lun Chiu, Kaohsiung (TW); Shyh-Jye Jou, Baoshan Township (TW); Yu-Hwai Tseng, New Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 0 days.

(21) Appl. No.: 17/723,873

(22) Filed: Apr. 19, 2022

(65) Prior Publication Data
US 2022/0338149 A1  Oct. 20, 2022

(30) Foreign Application Priority Data
Apr. 20, 2021 (TW) ................. 110114128

(51) Int. Cl.
*H04W 56/00*  (2009.01)
(52) U.S. Cl.
CPC .................... *H04W 56/004* (2013.01)
(58) Field of Classification Search
CPC ............. H04W 56/004; H04L 27/2657; H04L 27/2675; H04L 27/2656
See application file for complete search history.

(56) References Cited

U.S. PATENT DOCUMENTS

| 8,462,862 B2 | 6/2013 | Wang |
| 2013/0114453 A1 | 5/2013 | Hung et al. |

FOREIGN PATENT DOCUMENTS

| TW | 201004351 A | 1/2010 |
| TW | 201008209 A | 2/2010 |
| TW | 201105071 A1 | 2/2011 |
| TW | 201125406 A1 | 7/2011 |

(Continued)

OTHER PUBLICATIONS

Hsiao et al., "Multipath Division Multiple Access for 5G Cellular System based on Massive Antennas in Millimeter Wave Band", Jan. 31-Feb. 3, 2016, total 1 page.

(Continued)

*Primary Examiner* — Eric Myers
(74) *Attorney, Agent, or Firm* — Birch, Stewart, Kolasch & Birch, LLP

(57) ABSTRACT

A method of synchronization of wireless communication system is provided. The method includes the following steps: receiving a symbol from a wireless communication system by a user equipment; detecting ISI-free region of the received symbol; setting an endpoint of a FFT window within the ISI-free region; detecting shifted primary control frequency and shifted secondary control frequency of the symbol; calculating ICFO based on the shifted primary control frequency and a primary control frequency; calculating secondary control frequency based on ICFO and shifted secondary control frequency; finding the preamble of a frame based on the secondary control frequency; and determining, based on the preamble, a start point of the frame.

10 Claims, 7 Drawing Sheets

(56) References Cited

FOREIGN PATENT DOCUMENTS

TW            201320628 A1    5/2013

OTHER PUBLICATIONS

Lee, "Phase Noise-Robust Synchronization and Phase Noise Compensation Design for 10Gbps Single Carrier Baseband Receiver at 60 GHz Band", A Thesis Submitted to Institute of Electronics College of Electrical and Computer Engineering National Chiao Tung University in Partial Fulfillment of the Requirements for the Degree of Master of Science in Electronics Engineering, Feb. 2018, total 97 pages.

Lin, "A Study on Handset Synchronization and Cell Search Methods for 5G Cellular System based on Massive Antennas in Millimeter Wave Band", A Thesis Submitted to Institute of Communications Engineering College of Electrical Engineering National Chiao Tung University in partial Fulfillment of the Requirements for the Degree of Master In Communications Engineering, Jul. 2016, total 112 pages.

Liu, "Design for Indoor Wireless Digital Baseband Receiver at 60 GHz Band and Timing-Error Resilient Circuit", A Dissertation Submitted to Department of Electronics Engineering and Institute of Electronics College of Electrical and Computer Engineering National Chiso Tung University in Partial Fulfillment of the Requirements for the Degree of Doctor of Philosophy in Electronics Engineering, Sep. 2014, total 179 pages.

Wang et al., "Multipath Division Multiple Access for 5G Millimeter Wave Cellular Systems", 2020, total 6 pages.

US 11,825,434 B2

METHOD AND ARCHITECTURE OF SYNCHRONIZATION OF WIRELESS COMMUNICATION SYSTEM

TECHNICAL FIELD

The present invention relates to a method and architecture of synchronization of a wireless communication system, in particular, to a method and architecture of synchronization of a wireless communication system used in a cellular network.

RELATED ART

In recent years, the development of mobile devices has matured. As a result, the technology for providing network services to mobile devices has also developed rapidly, stimulated by huge demand.

A cellular network is a mobile communication architecture, and many mobile network technologies such as LTE adopt a cellular network architecture.

When a user equipment is connected to a cellular network, it needs to be synchronized with the base station in the cell of the cellular network where the user equipment is located. Nowadays, a user equipment recognizes the cell in which it is located through a cell identifier. However, there are areas for improvement for this method.

In addition, the prior art has more complex hardware requirements for normalization operations in the process of frame synchronization, and there is still room for further simplification.

SUMMARY

In an embodiment of the present invention, a wireless communication system synchronization method includes: receiving a symbol from a wireless communication system through a user equipment; detecting the inter-symbol interference-free interval of the symbol; setting an endpoint of a fast Fourier transform window in the inter-symbol interference-free interval; detecting an offset primary control frequency value and a plurality of offset secondary control frequency values of the symbol; calculating an integer frequency offset based on the offset primary control frequency value and a primary control frequency value; calculating a plurality of secondary control frequency values of the symbol based on the integer frequency offset and the offset secondary control frequency values; finding a preamble sequence of a frame based on the secondary control frequency values; and determining a start point of the frame based on the preamble sequence.

In another embodiment of the present invention, an architecture of synchronization of wireless communication system includes a wireless communication system, and a user equipment including: a signal receiving element for receiving a symbol from the wireless communication system; and at least one arithmetic unit for: detecting an inter-symbol interference-free interval of the symbol; setting an endpoint of a fast Fourier transform window in the inter-symbol interference-free interval; detecting an offset primary control frequency value and a plurality of offset secondary control frequency values of the symbol; calculating an integer frequency offset based on the offset primary control frequency value and a primary control frequency value; calculating a plurality of secondary control frequency values of the symbol based on the integer frequency offset and the offset secondary control frequency values; finding a preamble sequence of the frame based on the secondary control frequency values; and determining a start point of the frame of the symbol based on the preamble sequence.

DETAILED DESCRIPTION

Figure 1:
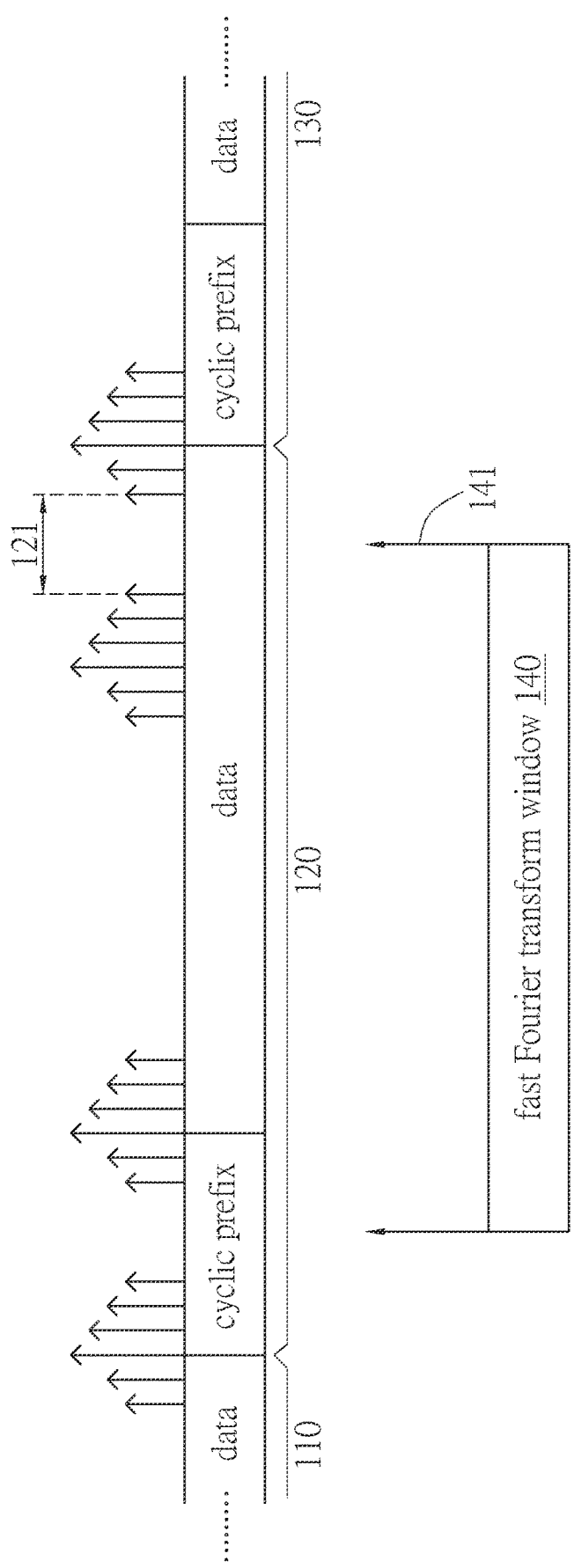
FIG. 1 shows a schematic diagram of a symbol and a fast Fourier transform window according to an embodiment of the present invention.

Referring to FIG. 1, FIG. 1 shows three consecutive exemplary symbols 110 to 130, of which symbol 110 and symbol 130 are only partially shown. As shown in FIG. 1, in recent years, in addition to the data to be transmitted, the symbols sent and received by the communication system also contain a cyclic prefix placed in front of the data. Because the channel may delay the symbols in the transmission process, this delay may cause two consecutive symbols to partially overlap each other, resulting in the receiving end of the communication system being unable to distinguish the data in the overlapping part of the two symbols. This phenomenon is called inter-symbol interference.

Generally, in order to protect a system from inter-symbol interference due to the delay of symbols, a cyclic prefix is added to each symbol. With the addition of a cyclic prefix, inter-symbol interference can be avoided on the premise that the interval of symbol delay is less than the interval of cyclic prefix. More specifically, the addition of a cyclic prefix forms an inter-symbol interference-free interval in the symbol. For example, referring to FIG. 1, the inter-symbol interference-free interval 121 is the inter-symbol interference-free interval of the symbol 120. If the sampling endpoint of the fast Fourier transform window is set in the inter-symbol interference-free interval before frequency-domain synchronization, inter-symbol interference can be avoided.

Figure 2:
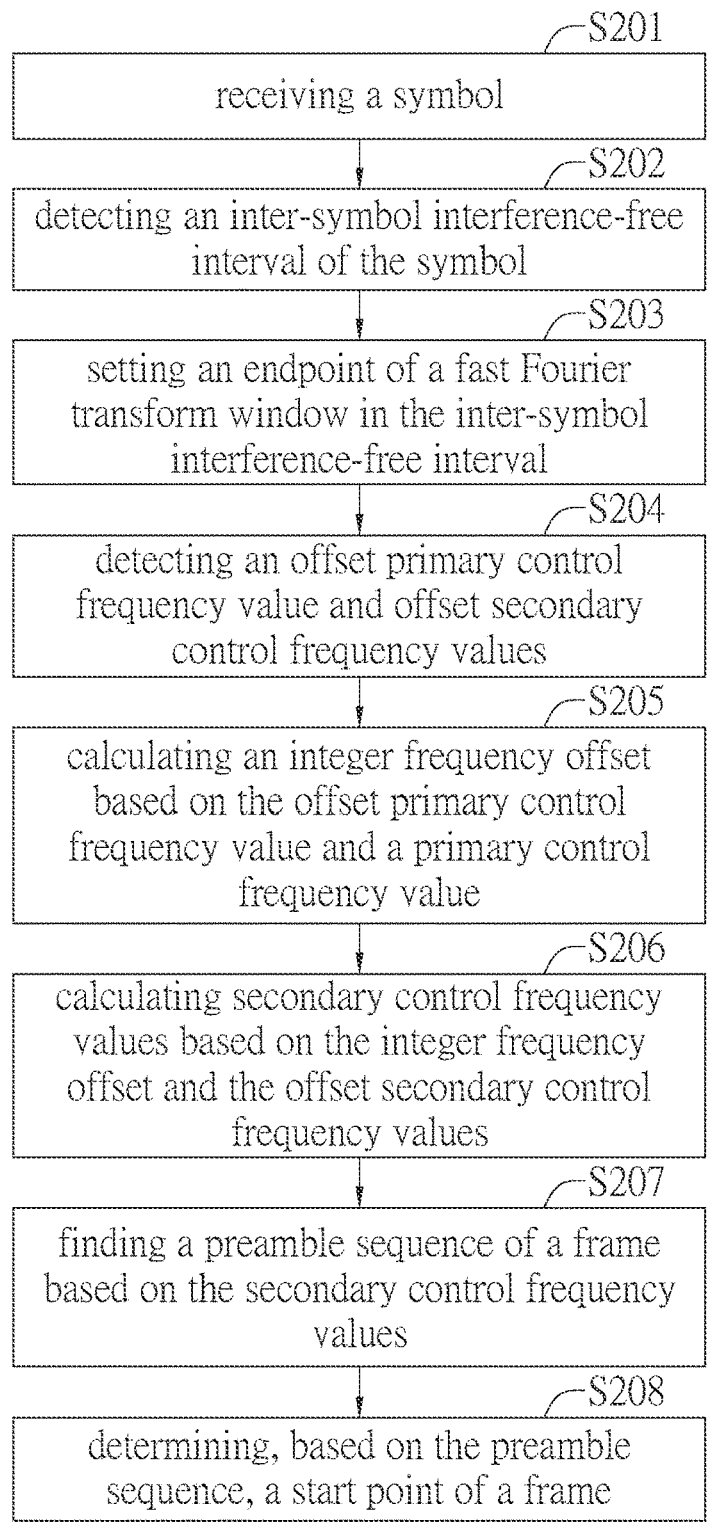
FIG. 2 shows a flowchart of a method of synchronization of the wireless communication system according to an embodiment of the present invention.
Figure 3:
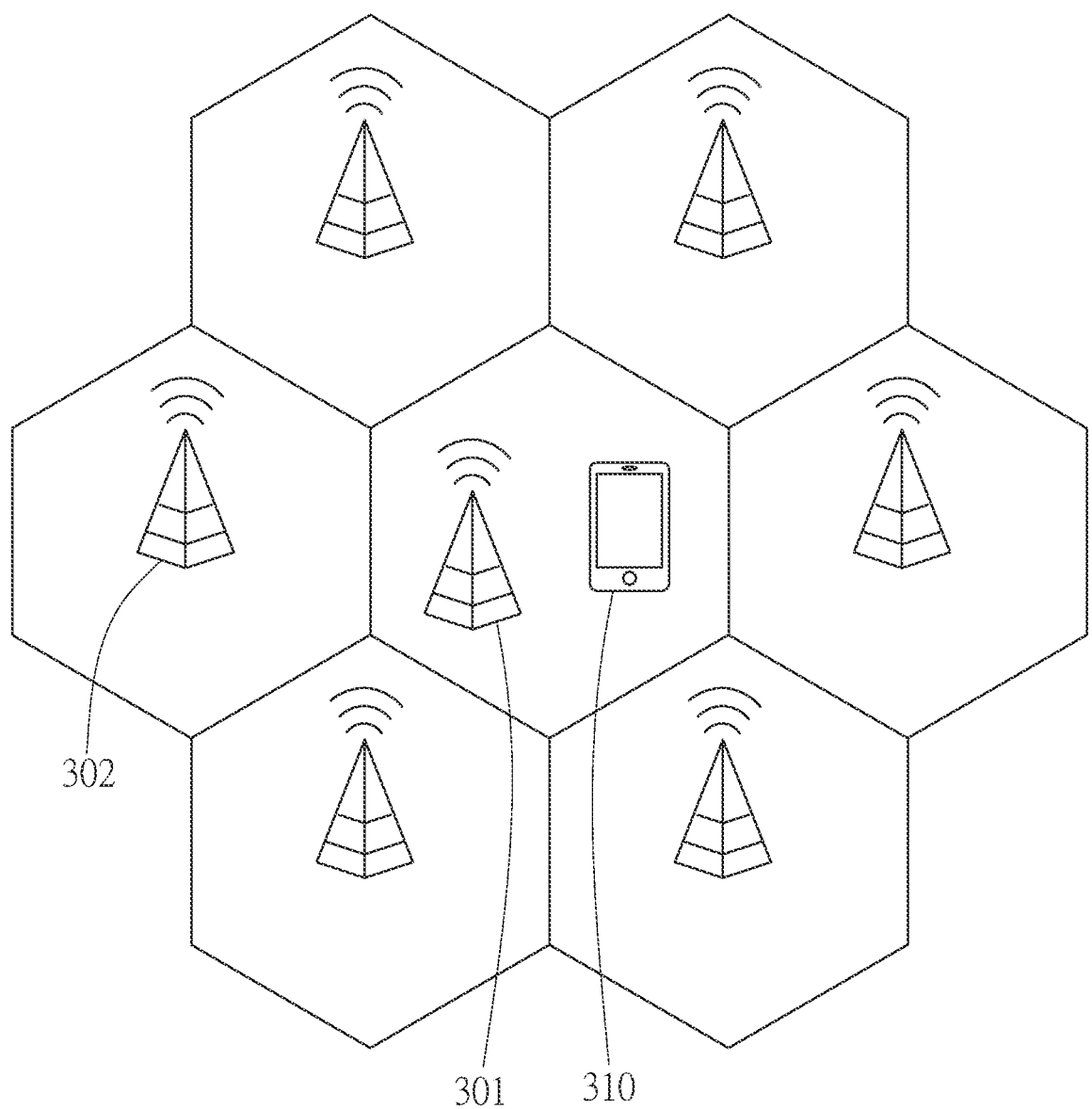
FIG. 3 shows a schematic diagram of an architecture of synchronization of wireless communication system including a cellular network system and a user equipment.

FIG. 2 illustrates a wireless communication system synchronization method 200 according to an embodiment of the present invention. Referring to FIGS. 1 to 3, in the present embodiment, in step S201, the user equipment 310 receives, by an included signal receiving element (not shown), the symbol 120 from the base station 301. Next, in step S202, the inter-symbol interference-free interval 121 of the symbol 120 of the user equipment 310 is detected.

Figure 4:
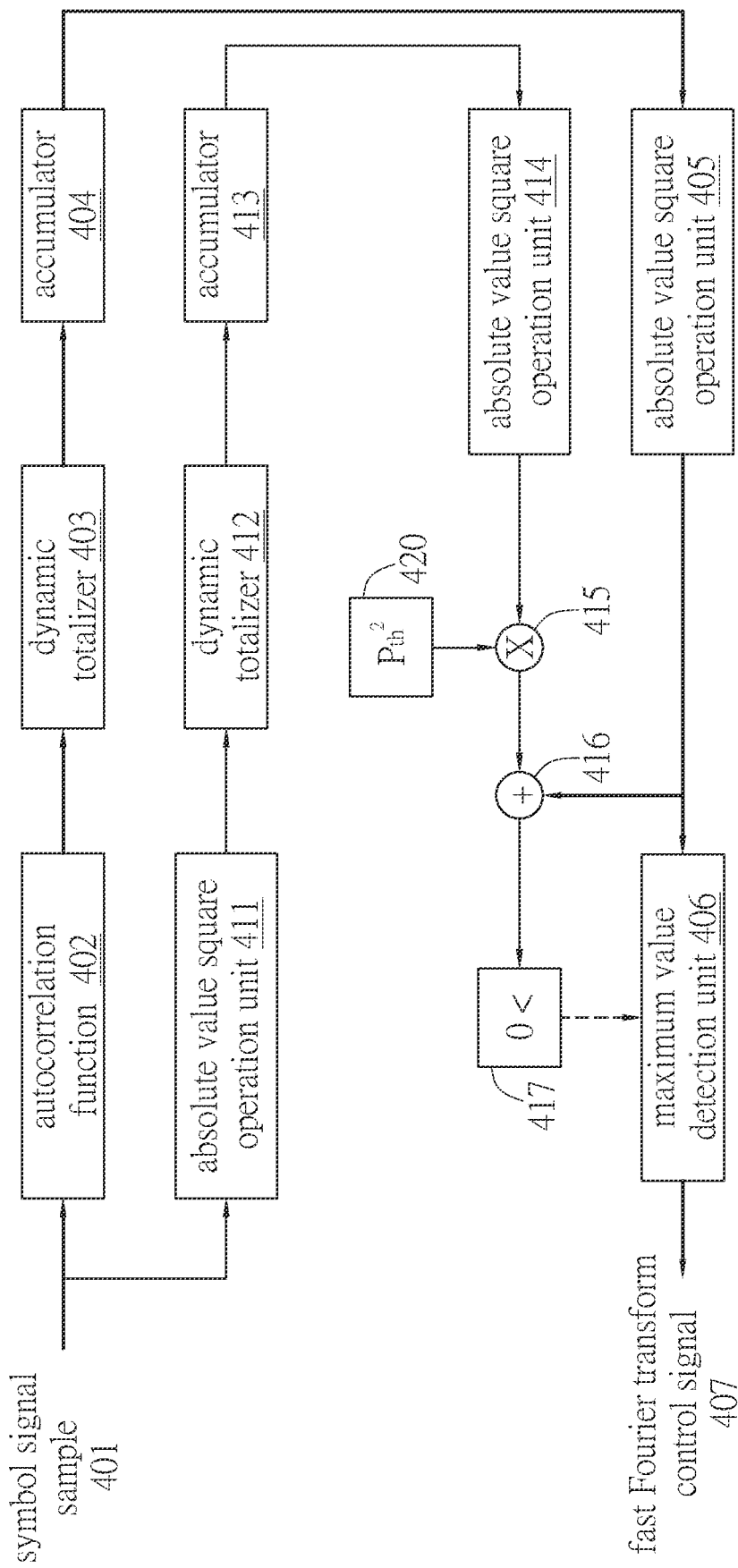
FIG. 4 shows a schematic diagram of a boundary detection mechanism according to an embodiment of the present invention.

A schematic diagram of detecting an inter-symbol interference-free interval in this embodiment is described below with reference to FIG. 4. The solid line shown in FIG. 4 represents the actual signal; the dotted line represents the control signal. In this embodiment, at least one arithmetic unit including, for example, the autocorrelation function 402, the dynamic totalizer 403, the accumulator 404, the absolute value square operation unit 405, the maximum value detection unit 406, the absolute value square operation unit 411, the dynamic totalizer 412, the accumulator 413, the absolute value square operation unit 414, the multiplier 415, the adder 416, and the comparator 417 are all arranged in the user equipment 310. The threshold parameter 420 may be a parameter stored in the user equipment 310 or calculated by the user equipment 310.

Referring to the thick line part of FIG. 4, in this embodiment, the user equipment 310 samples the symbol 120 to obtain the symbol signal sample 401, and then the autocorrelation function 402 calculates the autocorrelation function of the symbol signal sample 401.

Then, to eliminate impact from noise, the user equipment 310 performs a dynamic average operation on the autocorrelation function of the symbol signal sample 401, as shown in FIG. 4. In this embodiment, the user equipment only uses the dynamic totalizer 403 to perform a moving sum operation on the autocorrelation function of the symbol sample 401, and uses the accumulator 404 to accumulate the operation results of the dynamic totalizer 403, and omit the division process of dynamic average operation to save hardware cost. When the symbol signal contains noise, through the operation of dynamic average, the impact of noise can be removed by the characteristic that the average value of noise is zero over a period of time.

Then, the absolute value square operation unit 405 is used to calculate the calculation results of the accumulator 404, and the maximum value detection unit 406 is used to find the maximum value of the operation results of the absolute value square operation unit 405.

If the maximum value found by the maximum value detection unit 406 is greater than the threshold value calculated in the thin line part of FIG. 4, the user equipment 310 generates a fast Fourier transform control signal 407 according to the position where the maximum value is generated in the symbol.

Referring to the thin line part of FIG. 4, the absolute value square operation unit 411 calculates the absolute value square of its symbol signal sample 401 in order to calculate its energy; then, the dynamic totalizer 412 and the accumulator 413 perform a dynamic average operation on the output of the absolute value square operation unit 411. Then, the absolute value square operation unit 414 calculates the absolute value square of the output of the accumulator 413. Then, the multiplier 415 multiplies the output of the absolute value square operation unit 414 by the threshold parameter. After the adder 416 subtracts the operation result of the multiplier 415 from the operation result of the absolute value square operation unit 405, the comparator 417 determines whether the operation result of the adder 416 is greater than 0. If the operation result of the adder 416 is greater than 0, the comparator 417 outputs a control signal to the maximum value detection unit 406, causing the maximum value detection unit 406 to output the fast Fourier transform control signal 407.

Referring to FIGS. 1 to 4, after the user equipment 310 detects the inter-symbol interference-free interval 121 of the symbol 120, in step S203, the user equipment 310 may set the sampling endpoint 141 of the fast Fourier transform window 140 in the inter-symbol interference-free interval based on the fast Fourier transform control signal 407 to avoid the impact from inter-symbol interference in the subsequent steps of the wireless communication system synchronization method 200.

Referring again to FIG. 2, in step S204, the user equipment detects an offset primary control frequency value and a plurality of offset secondary control frequency values.

The method of detecting the offset primary control frequency value and the offset secondary control frequency value of the symbol in this embodiment is described below with reference to FIG. 1, FIG. 2, FIG. 3 and FIG. 5. In this embodiment, at least one arithmetic unit including, for example, the absolute value operation unit 502, the accumulator 503, the maximum value detection unit 504, the adder 505, the accumulator 507 and the maximum value detection unit 508 are all arranged in the user equipment 310.

Figure 5:
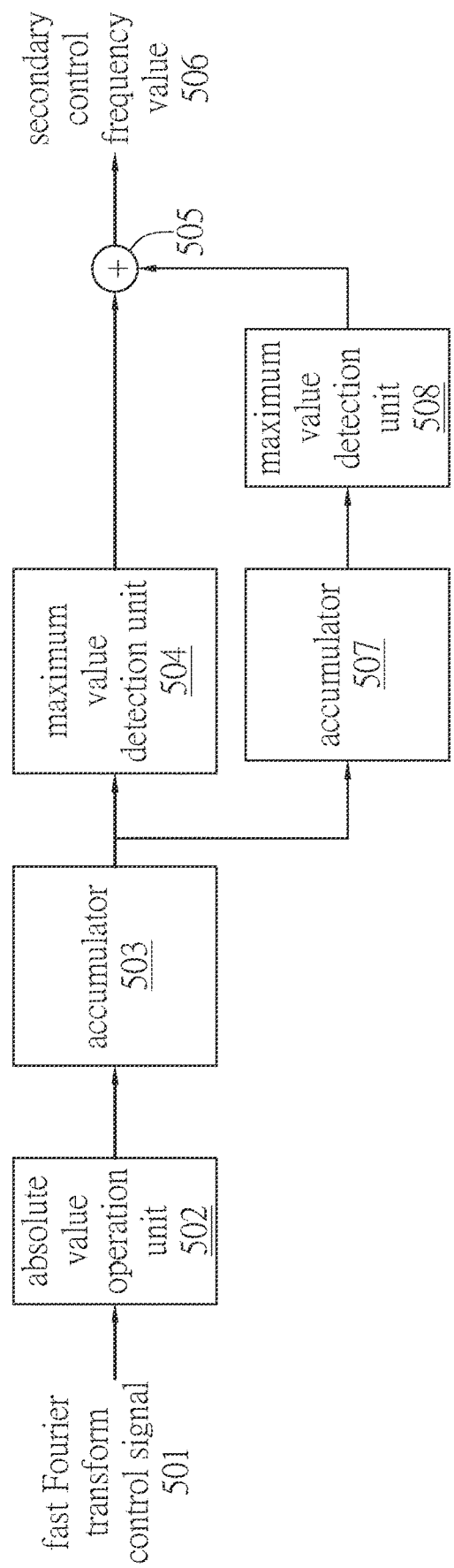
FIG. 5 shows a schematic diagram of a frequency domain synchronization mechanism according to an embodiment of the present invention.

Referring to the thick line part of FIG. 5, in this embodiment, the absolute value operation unit 502 in the user equipment 310 obtains the absolute value of the fast Fourier transform of the symbol 120; the accumulator 503 accumulates the operation result of the absolute value operation unit 502; and the maximum value detection unit 504 detects the maximum value of the operation result of the accumulator 503. This maximum value is the value of the primary control frequency of the cellular network that goes through an integer frequency offset.

Referring to the thin line part of FIG. 5, the accumulator 507 accumulates the output of the accumulator 503 again; the maximum value detection unit 508 detects the maximum value in the calculation result of the accumulator 507; and the maximum value detected by the maximum value detection unit 508 is the value of the secondary control frequency of the cell of the cellular network where the user equipment 310 is located that has gone through an integer frequency offset. In other words, referring to FIG. 3, the maximum value detected by the maximum value detection unit 508 is the value of the secondary control frequency of the base station 301 that has gone through an integer frequency offset.

Referring to FIG. 2 again, in step S205, the user equipment calculates an integer frequency offset based on the offset primary control frequency value and the correct primary control frequency value of the known cellular network. Referring to the thick lines in FIG. 5, in this embodiment, the calculated offset primary control frequency value is subtracted from the primary control frequency value of the cellular network to obtain the integer frequency offset formed by the symbol in the transmission process.

Referring to FIG. 2 again, in step S206, the user equipment calculates the plurality of secondary control frequency values of the symbol according to the integer frequency offset and the offset secondary control frequency value. Referring to the thin line part of FIG. 5, the adder 505 adds the maximum value from the calculation result of the accumulator 507 to the integer frequency offset value to obtain the secondary control frequency value 506 of the cell where the user equipment 310 is located (that is, the secondary control frequency value of the base station 301).

Figure 6A:
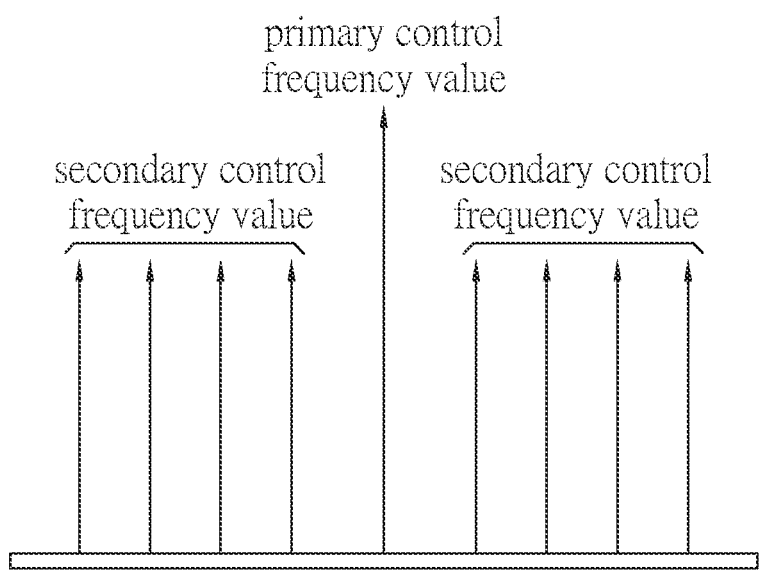
FIGS. 6A and 6B are schematic diagrams of the primary control frequency and the secondary control frequency according to an embodiment of the present invention.
Figure 6B:
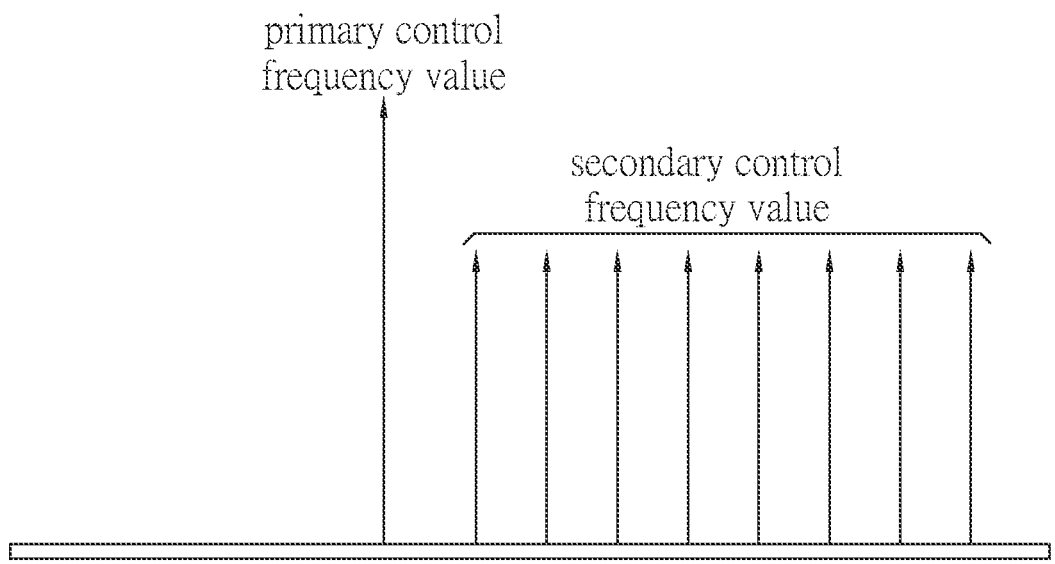

Referring to FIGS. 6A and 6B, in one embodiment of the present invention, a primary control frequency and a plurality of secondary control frequencies are used by the base station of each cell of the cellular network as carrier frequencies (in this embodiment, there are one primary control frequency and eight secondary control frequencies). Each cell uses the same primary control frequency and different combinations of secondary control frequencies. For example, referring to FIG. 3, FIG. 6A and FIG. 6B. FIGS. 6A and 6B may represent the same primary control frequency and different combinations of secondary control frequencies used by base station 301 and base station 302, respectively. As shown in FIGS. 6A and 6B, in this embodiment, the different combinations of secondary control frequencies used by two different cells may include four of the same secondary control frequencies and four different secondary control frequencies, but the present invention is not limited to this. In other embodiments, the combinations of secondary control frequencies used by two different cells may include other number of the same secondary control frequency or not include any same secondary control frequency at all. Referring to FIG. 3, FIG. 6A and FIG. 6B, the combination of secondary control frequencies used by the base station may be, for example, the combination of secondary control frequencies shown in FIG. 6A; the combination of secondary control frequencies used by the base station may be, for example, the combination of secondary control frequencies shown in FIG. 6B.

In some embodiments of the present invention, the cell identifier (cell ID) may be defined using the characteristics that the combination of secondary control frequencies of each cell are all different. Specifically, in different embodiments, the cell identifier of a cell may be defined as the combination of all of the secondary control frequencies of the cell, or the smallest secondary control frequency of the cell, or the largest secondary control frequency of the cell. The above list is only an example and is not intended to limit the present invention. For example, the cell identifier of a cell may also be defined as any or a combination of any number of all secondary control frequencies of the cell.

Figure 7A:
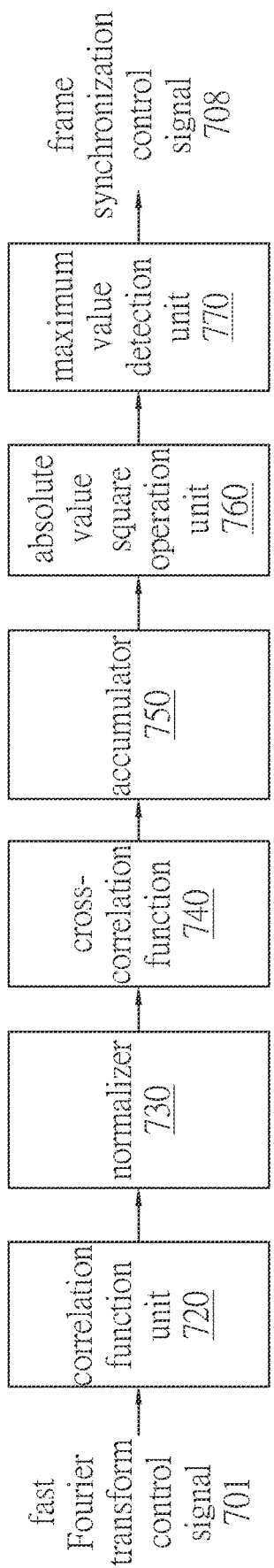
FIG. 7A shows a schematic diagram of a frame synchronization mechanism according to an embodiment of the present invention.
Figure 7B:
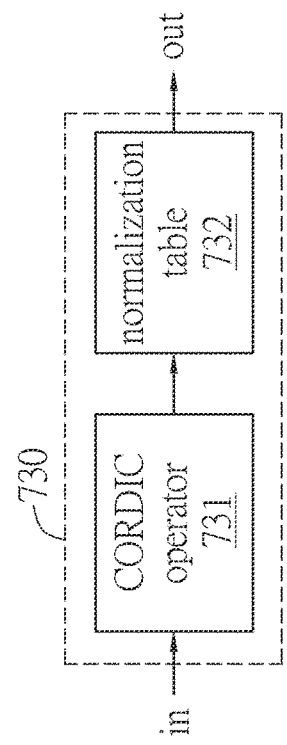
FIG. 7B shows a schematic diagram of a normalizer according to an embodiment of the present invention.

Referring to FIG. 2 again, in step S207, the user equipment finds the preamble sequence (preamble) of the frame of the communication system according to the plurality of secondary control frequency values found. An embodiment of finding the preamble sequence of the frame according to the present invention will be described below with reference to FIGS. 7A and 7B. In this embodiment, at least one arithmetic unit including, for example, the correlation function unit 720 and the normalizer 730 are all arranged in the user equipment 310. As shown in FIG. 7A, after the correlation function unit 720 performs the correlation function operation on the part of the secondary control frequency in the fast Fourier transform 701 of the carriers of the frame, the normalizer 730 then performs the normalization operation on the operation result of the correlation function unit 720. Referring to FIG. 7B, the coordinate rotation digital computer (CORDIC) operator 731 first performs the CORDIC operation (also known as Volder's algorithm) on its input signal to find the phase offset value of the preamble sequence, and then queries the normalization table 732 with the found phase offset value of the preamble sequence to find the reduction coefficient to restore the phase of the preamble sequence, and, according to the found reduction coefficient, restores the phase of the preamble sequence.

Referring to FIG. 2 again, in step S208, the user equipment determines the start point of the frame according to the preamble sequence found in step S207. An embodiment of determining the start point of the frame according to the present invention will be described below with reference to FIG. 7A. In this embodiment, at least one arithmetic unit including, for example, the cross-correlation function 740, the accumulator 750, the absolute value square operation unit 760 and the maximum value detection unit 770 are all arranged in the user equipment 310. Referring to FIG. 7A, the cross-correlation function 740 performs a cross-correlation operation on the output of the normalizer 730, the accumulator 750 accumulates the output of the cross-correlation function 740, and the absolute value square operation unit 760 takes the absolute value square of the output of the accumulator 750, and finally, the maximum value detection unit 770 takes the maximum value of the output of the absolute value square operation unit 760 as the frame synchronization signal. The user equipment may determine the start point of the frame based on the maximum value, so as to sample the signal at the correct time to complete synchronization.

What is claimed is:

1. A method of synchronization of wireless communication system, comprising:
   receiving a symbol from a wireless communication system by a user equipment;
   detecting an inter-symbol interference-free interval of the symbol;
   setting an endpoint of a fast Fourier transform window in the inter-symbol interference-free interval;
   detecting an offset primary control frequency value and a plurality of offset secondary control frequency values of the symbol;
   calculating an integer frequency offset based on the offset primary control frequency value and a primary control frequency value;
   calculating a plurality of secondary control frequency values of the symbol based on the integer frequency offset and the offset secondary control frequency values;
   finding a preamble sequence of a frame based on the secondary control frequency values; and
   determining, based on the preamble sequence, a start point of the frame.

2. The method of synchronization of wireless communication system according to claim 1, wherein the step of detecting the inter-symbol interference-free interval of the symbol includes performing a moving average operation of autocorrelation function value of the symbol and energy value of the symbol.

3. The method of synchronization of wireless communication system according to claim 1, further comprising:
   determining cellular identification information based on the secondary control frequencies.

4. The method of synchronization of wireless communication system according to claim 1, wherein the step of finding the preamble sequence of the frame based on the secondary control frequency values includes performing a normalization operation on the part of the symbol which belongs to the secondary control frequencies.

5. The method of synchronization of wireless communication system according to claim 4, wherein the process of the normalization operation includes using coordinate rotation digital computer (CORDIC) algorithm, and look-up table method on a normalization table.

6. An architecture of synchronization of wireless communication system, comprising:
   a wireless communication system; and
   a user equipment comprising:
   a signal receiving element, for receiving a symbol from the wireless communication system; and
   at least one arithmetic unit for:
      detecting an inter-symbol interference-free interval of the symbol;
      setting an endpoint of a fast Fourier transform window in the inter-symbol interference-free interval;

detecting an offset primary control frequency value and a plurality of offset secondary control frequency values of the symbol;

calculating an integer frequency offset based on the offset primary control frequency value and a primary control frequency value;

calculating a plurality of secondary control frequency values of the symbol based on the integer frequency offset and the offset secondary control frequency values;

finding a preamble sequence of the frame based on the secondary control frequency values; and determining, based on the preamble sequence, a start point of the frame of the symbol.

7. The architecture of synchronization of wireless communication system according to claim 6, wherein the arithmetic units perform a moving average operation on the autocorrelation function value of the symbol and the energy value of the symbol to detect the inter-symbol interference-free interval.

8. The architecture of synchronization of wireless communication system according to claim 6, wherein the arithmetic units are further used to determine cellular identification information based on the secondary control frequencies.

9. The architecture of synchronization of wireless communication system according to claim 6, wherein the arithmetic units perform a normalization operation on the part of the symbol which belongs to the secondary control frequencies to find the preamble sequence of the frame.

10. The architecture of synchronization of wireless communication system according to claim 9, wherein the process of the normalization operation includes using coordinate rotation digital computer (CORDIC) algorithm, and look-up table method on a normalization table.

* * * * *